Jan. 19, 1943.  A. J. WAGNER  2,308,946
ADJUSTABLE GAUGE
Filed Oct. 20, 1941
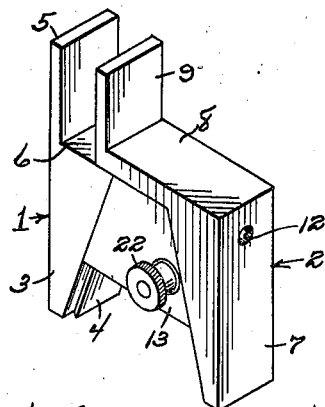
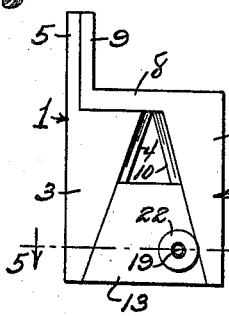 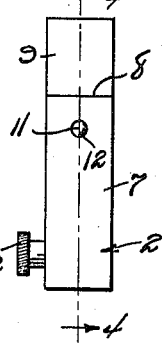 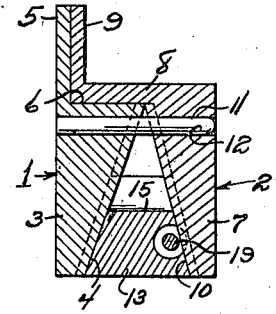
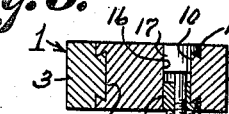 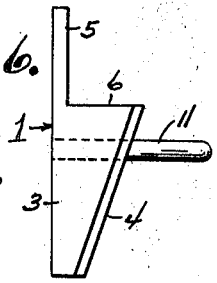 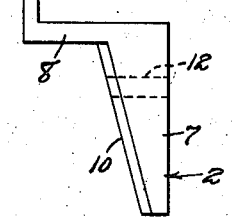
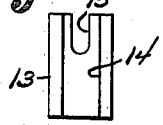 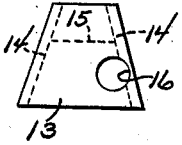
Arthur J. Wagner
INVENTOR.
BY
Victor J. Evans & Co.
ATTORNEYS Patented Jan. 19, 1943

2,308,946

UNITED STATES PATENT OFFICE 2,308,946

ADJUSTABLE GAUGE

Arthur J. Wagner, Honolulu, Territory of Hawaii

Application October 20, 1941, Serial No. 415,825

3 Claims. (Cl. 33—143)

This invention relates to thickness gauges or feelers, and its general object is to provide a gauge of that type which is adjustable and primarily designed for measuring the width of gaps, grooves, slots and the like, having a width greater than is possible to be measured by thickness gauges now in general use, as the leaves of ordinary thickness gauges are made in thicknesses of approximately one thousandth of an inch to one-eighth of an inch, and inside calipers, micrometers and the like are inadequate and unreliable for the purpose of which my gauge is designed.

A further object is to provide an adjustable thickness gauge that is capable of obtaining measurements with extreme accuracy, and can be locked in its adjusted positions against any possibility of displacement.

Another object is to provide an adjustable thickness gauge that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view of my gauge, adjusted with the blade or jaws in fully open position.

Figure 2 is a front view of the gauge, with the jaws completely closed.

Figure 3 is a view looking toward one side of the gauge.

Figure 4 is a sectional view taken approximately on line 4—4 of Figure 3, looking in the direction of the arrows.

Figure 5 is a sectional view taken approximately on line 5—5 of Figure 2, looking in the direction of the arrows.

Figure 6 is a front view of one of the jaw carrying members.

Figure 7 is a similar view of the other or companion jaw carrying member.

Figure 8 is a side view of the adjusting block.

Figure 9 is a front view of the block.

Referring to the drawing in detail, it will be noted that my gauge includes a pair of companion jaw carrying members 1 and 2 respectively, and the member 1 includes a body 3 of substantially triangular formation to provide an inclined inner side face formed with a dovetail rib 4 along and throughout the length thereof. The front, rear and outer side faces of the body 3 are flat and formed on the body 3 throughout the width thereof is a flat square cornered blade like jaw 5 at the outer end of the wide end face 6 and disposed at right angles thereto, with its outer face aligned with the outer side face of the body, as shown.

The member 2 also includes a substantially triangular shaped body 7 that is somewhat identical to the body 3, but is of slightly greater length and formed on and extending laterally and inwardly from the wide end of the body 7 is a flat extension 8 having formed on the outer end thereof and extending at right angles thereto a flat square cornered blade like jaw 9. The inclined inner side face of the body 5 is also formed with a dovetail rib 10 along and throughout the length thereof.

Fixed within the body 3 adjacent to and paralleling the wide end face 6 thereof, and extending from its inclined face, is a connecting pin 11 mounted for slidable movement in a bore 12 in the body 7, to hold the companion members together against endwise displacement and for movement thereof toward and away from each other, with the extension 8 mounted on the wide end face 6 for disposal of the jaw 9 in parallelism with the jaw 5, for cooperative association with the jaws, as will be apparent.

The members 1 and 2 are connected together by a wedge block 13 having dovetail grooves 14 in and along the inclined outer faces thereof, with the ribs 4 and 10 mounted in and fitting the grooves to allow free sliding movement of the wedge block along the inclined faces of the bodies 3 and 7 for moving the same toward and away from each other and consequently bringing about a corresponding movement or adjustment of the jaws 5 and 9. The block is provided with flat inner and outer faces and a relatively deep groove 15 extends along the longitudinal center of the inner face to accommodate the connecting pin 11, when the jaws are in their fully open position of Figure 1.

In order to hold the jaws in adjusted positions against any possibility of displacement, I provide locking means and for that purpose, the wedge block has a transverse cylindrical bore 16 extending transversely therethrough, and opening through one inclined face thereof. Fixed in the rear end of the bore 16 for disposal flush with the rear face of the block is a substantially cylindrical hook like member 17 having a flat face formed with an undercut lug 18 fitting and hooked in the adjacent side undercut face of the rib 10. Fixed to the member 17 and extending through the bore 16 for disposal a considerable distance forwardly of the front face of the block is a stem 19 having its outer end portion threaded. Mounted for slidable movement on the stem is a substantially cylindrical hook like member 20 similar to the member 17, as the member 20 is also formed with an undercut lug 21 fitting and hooked in the opposite side undercut face of the rib 10, as shown in Figure 5. Threaded on the stem 19 is a flanged nut 22 bearing against the member 20 for drawing the lugs in binding engagement with the rib 10.

From the above description and disclosure in the drawing, it will be obvious that when my gauge is used for taking the measurement of a width of a groove, for example, the jaws or blades are mounted within the groove. The wedge block is moved inwardly for disposing the jaws in binding engagement with the opposite walls of the groove. The jaws are then locked and removed from the groove, and the width of the groove is then determined by applying an outside micrometer to the outer faces of the jaws.

The gauge is preferably made in a pocket size to take measurements from three-sixteenths of an inch to one and one-half inches, but of course it can be made in any appropriate size, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A gauge comprising a pair of companion members, each of said members including a substantially triangular shaped body providing an inclined face, an extension formed on one body, a blade like jaw formed on the extension, a blade like jaw formed on the other body and the latter having the extension slidably mounted thereon for disposing the jaws in parellelism with each other, a wedge block connected to the inclined faces and slidably mounted thereon to adjust said jaws relative to each other, a pin fixed to one member and slidably mounted in the other member to hold the members against relative displacement, and means for locking said jaws in adjusted positions.

2. A gauge comprising a pair of companion members having inclined converging faces, a blade like jaw included in each member and the jaws being disposed in parallelism with each other, dovetail ribs formed on said faces, a wedge block provided with dovetail grooves fittingly receiving the ribs for slidable movement therein to adjust said jaws, and means carried by the block and engageable with one of said ribs for locking the jaws in adjusted positions.

3. A gauge comprising a pair of companion members having inclined converging faces, a blade like jaw included in each member and the jaws being disposed in parallelism with each other, a wedge block provided with dovetail grooves fittingly receiving the ribs for slidable movement thereon to adjust said jaws, hooked means fixed within the block and engaged with one side face of one rib, a threaded stem secured to and extending from the hooked means, a second hooked means slidably mounted on the stem and engageable with the opposite side face of the latter rib, and a serrated nut threaded on the stem to bear against the last mentioned hooked means for locking the jaws in adjusted positions.

ARTHUR J. WAGNER.